United States Patent [19]

Yabe et al.

[11] Patent Number: 4,499,043
[45] Date of Patent: Feb. 12, 1985

[54] PROCESS FOR PRODUCING A CELLULOSE ESTER SUPPORT

[75] Inventors: Masao Yabe; Kyoichi Naruo, both of Shizuoka; Kazuhiro Ono, Kanagawa, all of Japan

[73] Assignee: Fuji Photo Film Co., Ltd., Kanagawa, Japan

[21] Appl. No.: 375,631

[22] Filed: May 6, 1982

[30] Foreign Application Priority Data

May 6, 1981 [JP] Japan ................................ 56-67831

[51] Int. Cl.$^3$ .............................................. B29D 7/02
[52] U.S. Cl. .................................... 264/207; 106/196;
264/200; 264/232; 264/217; 536/76; 536/79
[58] Field of Search ................ 106/196; 264/207, 232, 264/344, 200, 217; 536/76, 79, 80

[56] References Cited

U.S. PATENT DOCUMENTS

| 2,469,395 | 5/1949 | Malm et al. | 536/76 |
| 2,775,584 | 12/1956 | White et al. | 536/76 |
| 4,316,867 | 2/1982 | Henry | 264/207 |

OTHER PUBLICATIONS

"Salt Effect in Cellulose Acetate", *Kogyo Kagaku Zashi*, 63:1617–1620 (1960), Hayashi (Teikoku Rayon Co. Iwakuni).

*Primary Examiner*—Jeffery Thurlow
*Attorney, Agent, or Firm*—Sughrue, Mion, Zinn Macpeak & Seas

[57] ABSTRACT

A process for producing a cellulose ester support is described which comprises producing said support from an organic solvent solution of a cellulose ester containing 30 ppm or less alkaline earth metal.

5 Claims, No Drawings

PROCESS FOR PRODUCING A CELLULOSE ESTER SUPPORT

FIELD OF THE INVENTION

This invention relates to a process for producing a cellulose ester support and, more particularly, to a process for producing a cellulose ester support from an organic solvent solution of cellulose ester containing a reduced amount of metal and having a low viscosity.

BACKGROUND OF THE INVENTION

Compounds such as cellulose acetate, cellulose acetate butyrate, cellulose acetate propionate have been used as cellulose ester supports in photographic light-sensitive materials. Cellulose triacetate has been popularly used due to its excellent characteristics such as dimensional stability, transparency, luster.

A process for producing cellulose triacetate film according to a solution process is conducted as follows. Cellulose acetate usually having a bound acetic acid content of 56% or more is dissolved in a mixed solvent of a lower hydrocarbon chloride (for example, methylene chloride) and a lower aliphatic alcohol (for example, methanol, ethanol, n-propanol, isopropanol, n-butanol, or the like). A proper plasticizer and, in some cases, a dye are added thereto. The resulting solution is subjected to purifying steps such as filtration, defoaming, and adjustment of viscosity (concentration), temperature, etc., then fed to a filming machine. The purified solution is extruded in a film form onto a moving support by means of a suitable film-forming machine (this procedure being generally referred to as casting procedure, and the moving support being a surface of rotary drum or endless belt). The solvent is evaporated from the solution film during almost one rotation of the support. The thus formed film is delaminated from the support surface and dried in a suitable drying machine to evaporate the remaining solvent from the delaminated film.

Therefore, when producing cellulose triacetate film, it is quite advantageous from the industrial point of view that the cellulose triacetate starting material readily form a uniform solution, that the cellulose triacetate solution permit a plasticizer and a dye added thereto to be readily and uniformly mixed therein, that the solution can be easily filtered and defoamed, that the solution can be easily extruded from the film-forming machine onto the moving support and that the solvent used can be easily evaporated from the solution film.

One approach for attaining the above-described advantages is the reduction of the viscosity of the cellulose triacetate solution.

In general, the viscosity of the cellulose triacetate solution can be reduced by decreasing degree of polymerization of the cellulose triacetate starting material and/or by decreasing the concentration of its solution.

However, reduction of the degree of polymerization of the cellulose triacetate starting material is accompanied by deterioration of the mechanical strength of the film prepared therefrom. Therefore, the above-described process is unfavorable.

However, a decrease in the concentration of the cellulose triacetate solution requires a high drying temperature and/or a long drying time in the solvent-evaporating step to be conducted after the casting procedure. Due to the increased use of energy and time this is disadvantageous method of production.

Thus, a cellulose triacetate solution with a high viscosity is usually used.

Therefore, currently conducted production steps involve the following defects.

(1) Stirring efficiency, when preparing the cellulose triacetate solution, is so poor that it takes a long time to obtain a uniform solution.

(2) Upon addition of a plasticizer and a dye to the solution, a long time is required for attaining uniform mixing.

(3) Piping must be completed using pipes with a large diameter due to great resistance of the solution in the transporting pipes. Therefore, a wide space is required for equipment, leading to serious equipment disadvantage. In addition, a solution-ejecting pump with a large amount of power must be used for transporting the solution, leading to disadvantage in production cost.

(4) In filtering the solution to remove foreign matter (non-soluble cellulose triacetate, dust, etc.), an increased pressure must be applied. Thus, a torch, pressure-resistant equipment and a large-power, solution-ejecting pump must be used. This is disadvantageous from the point of view of equipment and production cost. With respect to safety, it should be noted that the application of an increased filtering pressure can result in gushing out of the solution.

(5) When defoaming the solution, the temperature of the solution is raised and/or a pressure is applied thereto, which leads to the same disadvantage as described in (4). Defoaming the solution by allowing it to stand requires a long period of time.

(6) When extruding the solution from a film-forming machine onto a moving support, an increase in extrusion speed causes disturbance in stream of said solution in the film-forming machine, and the surface of solution film is difficult to be leveled. Thus the resulting film can not be practically used. The resulting film is particularly unsuited as a support for photographic light-sensitive material. Therefore, the extrusion speed must be reduced to such a degree that no disturbance takes place in the solution, which is industrially quite disadvantageous. The above-described disadvantages are also encountered when using other cellulose esters.

SUMMARY OF THE INVENTION

An object of the present invention is to provide a process for producing a cellulose ester support using a cellulose ester starting material which makes it possible to produce a cellulose ester solution having a small viscosity without reducing the degree of polymerization of the cellulose ester starting material and without decreasing the concentration of the cellulose ester solution.

Another object of the present invention is to provide a process for producing a cellulose ester support using a cellulose ester starting material which makes it possible to produce a solution permitting high speed film formation.

A further object of the present invention is to provide a process for producing a cellulose ester support using a cellulose ester starting material which can provide a support having excellent mechanical strength.

Still a further object of the present invention is to provide a process for producing a cellulose ester support having a highly uniform surface.

Still a further object of the present invention is to provide a process for producing a cellulose ester support by using a cellulose ester starting material which does not adversely affect photographic properties.

As a result of intensive investigations, the inventors have found that the content of alkaline earth metal in the cellulose ester is an important factor effecting the viscosity of the cellulose ester solution.

The present invention relates to a process for producing a cellulose ester support, which comprises producing the support from an organic solvent solution of a cellulose ester containing 30 ppm or less alkaline earth metal. This invention is particularly usefully applied to supports for photographic light-sensitive materials.

DETAILED DESCRIPTION OF THE INVENTION

In general, cellulose triacetate produced by a process for producing a cellulose triacetate support, for example, an acetic acid process contains about 50 to about 100 ppm alkaline earth metal. The acetic acid process is a process which comprises adding acetic anhydride and sulfuric acid to cellulose to acetylate cellulose, then neutralizing used sulfuric acid with calcium acetate, magnesium acetate or the like. The cellulose acetate produced by the acetic acid process contains an alkaline earth metal such as calcium or magnesium. Surprisingly, the viscosity of the cellulose triacetate solution is remarkably reduced by decreasing the content of the alkaline earth metal to the degree of 30 ppm or less. Within the range of 30 ppm or less (with respect to the content of the alkaline earth metal) the viscosity of the solution decreases in proportion to the degree of decrease in the content of the alkaline earth metal.

For the cellulose ester it is preferable to use cellulose acetate, cellulose acetate butyrate, cellulose acetate propionate. Of these, cellulose acetate having the degree of polymerization of 250 to 400 and a bound acetic acid content of 54 to 62% is particularly preferable.

The plasticizers include triphenyl phosphate, biphenyldiphenyl phosphate, dimethoxyethyl phthalate, ethylphthalylethylene glycol, etc. None of these plasticizers deteriorate the advantageous effects of the present invention.

The plasticizers are used preferably in amounts of 5 to 20 wt % based on the weight of the cellulose ester.

Preferable solvents which can be used include lower aliphatic hydrocarbon chlorides such as methylene chloride, and lower aliphatic alcohols such as methanol, ethanol, n-propyl alcohol, isopropyl alcohol and n-butanol. Methanol and ethanol may be used alone or in combination with n-butanol, etc. As to solvent proportion, 80 to 100 wt % methylene chloride and 0 to 20 wt % lower aliphatic alcohol are preferably employed.

Concentration of said cellulose ester is preferably 10 to 50 wt %.

If necessary, additives may be included in the cellulose ester solution such as an alkaline earth metal-free dye or a polymer soluble in the aforesaid solvents.

PROCESS FOR REMOVING ALKALINE EARTH METAL

One example of the process for removing alkaline earth metal from alkaline earth metal-containing cellulose triacetate to a degree of 30 ppm or less is as follows.

10 g of cellulose triacetate is dissolved in 1,000 g of glacial acetic acid. Then, 1,000 g of water is added to the acetic acid solution under stirring to precipitate cellulose triacetate. Cellulose triacetate thus precipitated is collected by filtration and dried at 110° C. for about 24 hrs.

EXAMPLE 1

To each of the cellulose acetate samples given in the following table was added a mixture of triphenyl phosphate and biphenyldiphenyl phosphate (3:1 by weight) as a plasticizer in an amount of 10 wt % based on the cellulose acetate. Then, cellulose acetate solutions containing 20 wt % cellulose acetate were prepared from respective samples using a mixture solvent of methylene chloride and methanol (9:1 by weight). The viscosity of each solution was measured at 20° C. according to a falling ball viscometer.

Falling ball viscometer: steel ball: 5/16 inch; specific gravity: 7.78; glass cylinder : 1.00 inch in inside diameter; falling distance: 10.0 inches

|  | Degree of Polymerization | Degree of Acetylation | Content of Alkaline Earth Metal (ppm) | Viscosity (poise) |
| --- | --- | --- | --- | --- |
| Sample A | 300 | 61.0 | 87 | 1300 |
| B | 300 | 61.0 | 35 | 1230 |
| C | 300 | 61.0 | 30 | 700 |
| D | 300 | 61.0 | 4 | 620 |
| E | 250 | 61.5 | 50 | 620 |
| F | 250 | 61.5 | 35 | 600 |
| G | 250 | 61.5 | 30 | 310 |
| H | 250 | 61.5 | 4 | 280 |

Samples B, C, and D were prepared by treating sample A as described hereinbefore to remove alkaline earth metal.

Samples F, G, and H were prepared by treating sample E as described hereinbefore to remove alkaline earth metal.

Comparison of sample A with sample B reveals that, even though the content of alkaline earth metal was reduced from 87 ppm to 35 ppm, viscosity was changed only from 1300 poises to 1230 poises. However, when the content of the alkaline earth metal was reduced to 30 ppm as with sample C, the viscosity surprisingly became about half of that of sample A.

Comparison of sample E with sample F reveals that, even though the content of alkaline earth metal was reduced from 50 ppm to 35 ppm, the viscosity was changed only from 620 poises to 600 poises. However, when the content of the alkaline earth metal was reduced to 30 ppm as with sample G, the viscosity surprisingly became about half of that of sample E.

Sample D having the degree of polymerization of 300 showed the same viscosity as that of sample E having the degree of polymerization of only 250.

When samples D and E were casted, the dope stream-disturbing speed of sample D was 50 m/min., which was the same as that of sample E in spite of the fact that the degree of polymerization of sample D was higher than that of sample E by 50.

However, mechanical properties of the film obtained by casting sample E was inferior to those of the film obtained by casting sample D as shown below.

|  | Tear Strength (g/100μ) | Folding Endurance (times/100μ) | Breaking Stress (Kg/mm$^2$) | Breaking Extension (%) |
| --- | --- | --- | --- | --- |
| Sample D | 42 g (n = 7) | 83 times | 11.5 | 40 |

-continued

|   | Tear Strength (g/100μ) | Folding Endurance (times/100μ) | Breaking Stress (Kg/mm²) | Breaking Extension (%) |
|---|---|---|---|---|
| E | 35 g (n = 7) | 55 times | 11.5 | 35 |

Additionally, when the cellulose acetate film of the present invention was coated, after undercoating, with a color photographic emulsion, no detrimental influences on photographic properties were observed.

While the invention has been described in detail and with reference to specific embodiment thereof, it will be apparent to one skilled in the art that various changes and modifications can be made therein without departing from the spirit and scope thereof.

What is claimed is:

1. A process for producing a cellulose ester support comprising the steps of:
    providing a cellulose ester;
    removing alkaline earth metal from the cellulose ester to the extent that the cellulose ester contains 30 ppm or less alkaline earth metal;
    adding a solvent for the cellulose ester;
    adding a plasticizer;
    mixing the cellulose ester, solvent and plasticizer to form a mixture;
    extruding the mixture to form the solution film;
    allowing the solvent to evaporate;
    delaminating the thus formed film; and
    drying the delaminated film.

2. A process for producing a cellulose ester support, as claimed in claim 1, wherein the cellulose ester is cellulose acetate having the degree of polymerization of 250 to 400 and a bound acetic acid content of 54 to 62%.

3. A process for producing a cellulose ester support, as claimed in any of claims 1 or 2, wherein the plasticizer is contained in an amount of 5 to 20 wt % based on the weight of the cellulose ester.

4. A process for producing a cellulose ester support, as claimed in any of claims 1 or 2, wherein the solvent is a lower aliphatic hydrocarbon chloride and a lower aliphatic alcohol.

5. A process for producing a cellulose ester support, as claimed in claim 1, wherein concentration of said cellulose estrer is 10 to 50 wt %.

* * * * *